United States Patent [19]

MacDonald et al.

[11] Patent Number: 5,367,589
[45] Date of Patent: Nov. 22, 1994

[54] OPTICAL FIBER PACKAGE

[75] Inventors: William M. MacDonald, Flemington; Victor Mizrahi, Bedminster, both of N.J.; Kenneth T. Short, Miranda, Australia

[73] Assignee: AT&T Bell Laboratories, Murray Hill, N.J.

[21] Appl. No.: 141,889

[22] Filed: Oct. 22, 1993

[51] Int. Cl.⁵ .............................................. G02B 6/34
[52] U.S. Cl. ....................................... 385/37; 385/123
[58] Field of Search ...................... 385/31, 37, 95–99, 385/123, 124, 129, 135, 147

[56] References Cited

U.S. PATENT DOCUMENTS

| | | | |
|---|---|---|---|
| 4,474,427 | 5/1979 | Hill et al. | 385/123 |
| 4,593,969 | 6/1986 | Goodman et al. | 385/37 |
| 4,636,031 | 1/1987 | Schmadel, Jr. et al. | 385/37 |
| 5,007,705 | 12/1989 | Morey et al. | 385/12 |
| 5,042,897 | 12/1989 | Meltz et al. | 385/37 |

FOREIGN PATENT DOCUMENTS 3005647  2/1980  Germany .

OTHER PUBLICATIONS

"Design of a Single-Mode Linear-Cavity Erbium Fiber Laser Utilizing Bragg Reflectors" By Ball et al., Journal of light wave Tech., Oct. 1992 p. 1338.

"Bragg Grating Formation & Germanosilicate Fiber Photosensitivity" by Meltz et al., May 1991, pp. 185–199.

Primary Examiner—Akm E. Ullah
Attorney, Agent, or Firm—Richard J. Botos

[57] ABSTRACT

A package that protects an optical fiber from strain or controls the strain to which the fiber is subjected for a desired effect and a method for making the package are disclosed. The package is a sleeve with an internal passage in which a portion of an optical fiber is placed. The optical fiber and the sleeve are made of materials with coefficients of thermal expansion that are the same or different.

If the coefficients of thermal expansion are the same, the package protects the fiber from certain strains brought about by a change in temperature that would otherwise result if the package and the fiber were made of different materials. However, by selectively mismatching the coefficients of thermal expansion of the package and the fiber, a change in temperature can be used to bring about a desired change in the wavelength of a grating written in the fiber. The optical fiber is fixed in the sleeve by epoxy or other adhesive means at least at one point in the internal passage of the sleeve.

15 Claims, 1 Drawing Sheet

OPTICAL FIBER PACKAGE

BACKGROUND OF THE INVENTION

1. Field of the Invention

This invention is directed to a package for an optical fiber that controls the amount of swain to which the fiber is subjected.

2. Art Background

Gratings that are written into optical fibers perform a variety of functions. For example, two gratings are written in proximity to each other in an optical fiber doped with a rare earth metal. Rare-earth-doped fibers have been used as a gain medium in a single-frequency linear cavity fiber laser. Such a laser is described in Ball, G. A., et al., "Design of a Single-Mode Linear-Cavity Erbium Fiber Laser Utilizing Bragg Reflectors," *Journal of Lightwave Technology*, 10(10): 1338 (October 1992). Gratings are periodic, permanent refractive index perturbations. A grating written in a fiber reflects light of a particular wavelength or band of wavelengths. Other wavelengths of light are transmitted through the grating.

The wavelength or wavelength band of light that is reflected by the grating is referred to as the grating wavelength. The grating itself is a plurality of grating elements that are written into an optical fiber using techniques such as those described in U.S. Pat. No. 5,042,897 to Meltz et al. Gratings, however, are precision components. To maintain this precision, the grating itself must not be distorted. This is because the operation of the grating depends upon the orientation and the spacing of the individual grating elements relative to one another. If the grating is distorted, the relationship between the various grating elements may be changed with a concomitant change in the wavelengths of light that are transmitted and reflected by the grating. As discussed in Meltz, G., et al., "Bragg Grating Formation and Germanosilicate Fiber Photosensitivity", SPIE, 1516:185-199 (May 1991), gratings written into optical fibers are subject to distortion if the fibers are subjected to strain in the vicinity of the grating.

Gratings written into an optical fiber can function as feedback elements for a fiber optic laser. Typically, two gratings are written into an optical fiber to provide the feedback. Each grating is a wavelength-selective reflector having a reflectance response curve with at least one well-defined peak. The precise wavelength of operation of the laser is determined, at least in part, by the relationship between the modal structure of the cavity and the reflectance curve of the gratings. That is, for the laser to exhibit gain at a given wavelength (under appropriate stimulation), the given wavelength must fall within a reflectance peak of the gratings. If the fiber in which the gratings are written is subjected to strain, however, the reflectance peak of one or both of the gratings may shift. If the reflectance peaks of the two gratings are unequal, the feedback of the two gratings will be mismatched. If the grating feedbacks are mismatched, the laser will not operate as efficiently. If the mismatch is severe, the laser will not operate at all.

Strains that induce the grating wavelength to shift result from the fiber and the package expanding to different degrees in response to a change in temperature or from external strains on the fiber. Such strains also result from mechanical tension on the optical fiber or from vibrations generated by external forces. Therefore, a package that protects an optical fiber with a grating written therein from strain or subjects the fiber to a controlled strain to produce a desired change in the grating wavelength is desired.

SUMMARY OF THE INVENTION

The present invention is directed to a package for an optical fiber that controls the amount of strain to which the fiber is subjected. The present invention is further directed to a method for placing an optical fiber with at least one grating written therein into a package. If desired, the fiber with the grating therein is placed in the package without significantly changing the grating wavelength. Whether a change in the grating wavelength is significant will depend upon how the grating is used. In certain applications, a 0.01 percent change in the wavelength will be significant. In other applications, a one percent change in the grating wavelength is permissible. In the present invention, the act of placing the fiber in the package will change the grating wavelength by no more than 0.01 percent. However, the grating wavelength is changed to a greater extent if desired.

For example, it is contemplated that a strain will be deliberately induced in the fiber while the fiber is being fixed into the package in order to induce a change in the grating wavelength. If the fiber is subjected to strain while being placed in the package, the grating wavelength may be significantly different than the prestrain grating wavelength. However, once the appropriate strain is applied to achieve the desired change in the grating wavelength, fixing the fiber in the package will not change the grating wavelength further to a significant degree.

Gratings are written in the fiber using known techniques. It is advantageous if the grating is written after the coating, if present, has been removed from that portion of the fiber in which the grating is written but before that portion of the fiber with the gratings therein is placed in a package.

The package for the optical fiber is configured in any suitable manner. One example of a suitable configuration is a sleeve such as a capillary tube. The fiber is fixed in the package by using an adhesive to attach the fiber directly to the interior of the package.

The package does not eliminate the effects of a change in temperature on the grating wavelength. However, it is contemplated that the package will be used to harness the effect of thermal and mechanical strains on the fiber to achieve a desired change in the wavelength of the gratings written in the optical fiber. The package and fiber are made of materials with a known coefficient of thermal expansion. These coefficients of thermal expansion are the same or different, depending upon whether the materials from which the fiber and package are made are the same or different. Using the known values for the coefficients of thermal expansion, the effect of a temperature change on grating wavelength is calculated, using mathematical relationships described in Meltz, G. et al., "Bragg Grating Formation and Germanosilicate Fiber Photo-Sensitivity", SPIE, vol. 1516, pp. 185-199 (May 1991). The grating wavelength is changed to a desired degree by simply heating or cooling the package with the fiber therein to a certain extent.

If the materials selected for the package and the fiber have identical coefficients of thermal expansion, then the materials will contract or expand to the same degree in response to a change in temperature. If the package and fiber exhibit the same such response to a change in temperature, the fiber will not be subjected to strains it would otherwise experience if the package and fiber expanded or contracted to different degrees in response to a change in temperature. If the materials selected for the fiber and package are different, then the materials will expand or contract to different degrees in response to a change in temperature. This will introduce additional strain into the fiber which, in turn, will cause the grating wavelength to shift to an even greater extent in response to a change in temperature.

The grating wavelength is also altered to a controlled degree by subjecting the fiber to mechanical stress. Such stress is induced by fixing the fiber to the package at a point near one end of the package. The fiber is not so affixed at the opposite end. The grating wavelength is altered by subjecting the fiber that projects from the opposite end of the package to controlled tension.

The fiber is also further protected from strains caused by external vibrations by placing the package on a material that has some capacity to absorb vibration. Examples of suitable materials include common materials known for their ability to absorb vibrations. These materials include synthetic materials used for cushioning, common packaging materials, and other such materials which absorb vibrational energy.

The fiber is placed in the package by first selecting a package made of the desired material. The package is either made of a material with a coefficient of thermal expansion that substantially matches the coefficient of thermal expansion of the fiber or is substantially different from the coefficient of thermal expansion of the fiber.

The package is preferably a sleeve or capillary tube, the inner diameter of which is slightly larger than the outer diameter of the optical fiber to be placed in the package. The outer diameter of the fiber includes the coating, if any, on the fiber. The coating, if present, is removed from those portions of the fiber that are to be affixed to the package. The fiber is positioned in the package so that the portion of the fiber from which the coating has been removed is within the confines of the package. An epoxy resin or other suitable adhesive is then applied between the fiber and the package. At least some portion of the adhesive is placed in contact with the fiber to ensure that the epoxy binds the fiber, and not just the coating, to the package. If the fiber is to be fixed to the package at both ends, the epoxy resin is first applied in one end and cured. In certain applications, the epoxy resin is then applied in the other end and cured.

The fiber is placed in the package such that the grating written in the fiber is within the confines of the package. The epoxy is placed such that it is interposed between the grating and the end of the package. The epoxy affixes the fiber directly to the package. Any mechanical stress to which the fiber is subjected is transferred to the package via the epoxy. Since the epoxy is interposed between the end of the package and the fiber written in the grating, mechanical stresses that are applied on the portion of the fiber which is on the side of the epoxy opposite the grating are transferred to the package and do not affect the grating. If the fiber is not so affixed to the package, mechanical strains to which with fiber is subjected will affect the wavelength of the grating. The fiber is affixed within the package so that the fiber will withstand at least 1000 pounds per square inch (psi) of pressure before the fiber is dislodged from the package. If the fiber is fixed in the package by applying epoxy at both ends of the package, the fiber will withstand 1000 psi and, in certain instances, up to 200,000 psi, before the strain causes the wavelength or wavelength band of the grating to shift significantly.

A vent in the package at some point between the ends of the package in which the epoxy resin is inserted is also advantageous. This vent permits air to escape from the capillary tube after epoxy has been placed in the second end of the capillary tube.

DETAILED DESCRIPTION

The present invention is directed to a package that provides an environment that controls the strain to which the optical fiber is protected and a method for placing an optical fiber in the package. The package with the optical fiber placed therein is depicted in FIG. 1.

Figure 1:
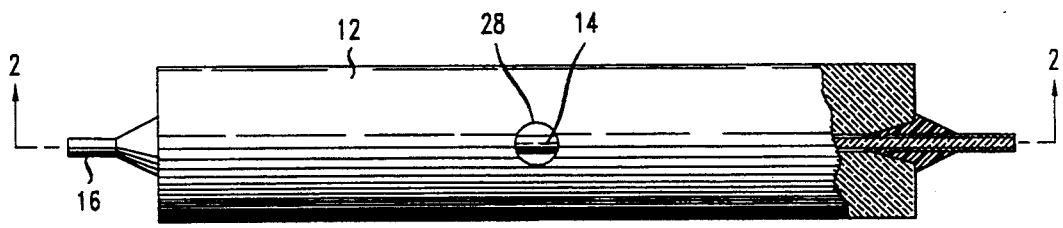
FIG. 1, is a plan view of a coated optical fiber in a package of the present invention.

FIG. 1 is a top plan view of the package 12 with the optional fiber 14 placed therein. Although not shown, the optical fiber 14 has a core surrounded by a cladding. The optical fiber 14 shown on either side of the package 12 is within a coating 16. However, it is contemplated that uncoated fibers are placed in the package as well. A vent 28 is clearly visible at the top of the package.

Figure 2:
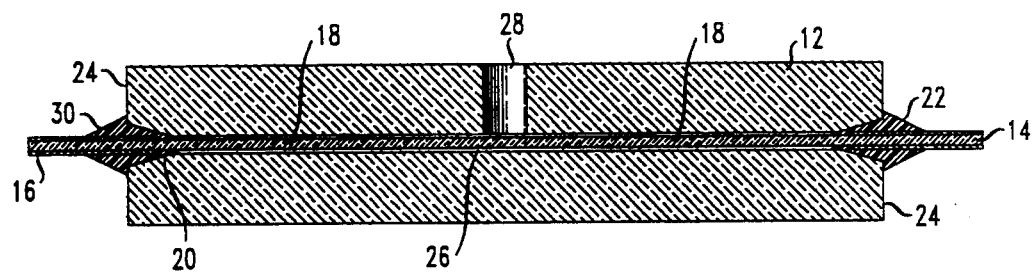
FIG. 2 is a cut-away view of an optical fiber as depicted in FIG. 1 along line 2—2 of FIG. 1.

FIG. 2 is a cutaway view looking across line 2—2 of FIG. 1. FIG. 2 shows the orientation of the optical fiber 14 in the package 12. The package 12 has an internal passage 26 through which the optical fiber is inserted. The diameter of the internal passage 26 is greater than the outer diameter of the optical fiber 14 with the coating 16 thereon. For example, the diameter of the passage 26 in the package 12 is about 1.2 times the diameter of the coating 16 on the optical fiber 14. However, in certain instances it is contemplated that the diameter of the package 12 will be significantly more than 1.2 times the diameter of the coating 16 on the optical fiber 14.

The coating 16 on the optical fiber 14 is removed from some portion of the fiber 14 that is placed in the package 12. The coating is not required to be removed from the entire portion of the fiber that is in the package. As illustrated in FIG. 2, the coating 16 remains on a small portion of the fiber 14 within the confines of the package 12. Those portions of the coating 16 that remain on the fiber 14 are located at the ends 24 of the package 12. However, a greater portion of the coating 16 is retained on the fiber 14, if desired. Although not so depicted in FIG. 2, it is contemplated that the coating will only be removed from those portions of the fiber 14 which are directly affixed to the package 12 and those portions of the fiber 14 in which the gratings 18 are written.

Typically, gratings 18 are written in the fiber. The gratings 18 are not specifically illustrated, but their location is indicated by the numerals 18. As referred to herein, gratings are any wavelength sensitive fiber element. In FIG. 2, gratings 18 are shown at two locations on the fiber 14 within the: confines of the package 12. These gratings are also located between the two points at which the epoxy 22 is placed. As depicted, only a small portion of the overall length of the fiber 14 in the package 12 is in direct contact with the epoxy 22. It is contemplated for the epoxy 22 or some other adhesive to be placed between the fiber and me package up to and including throughout the length of the package, if desired. The portion of the passage 26 in the package 12 where there is no epoxy interposed between the fiber 14 and the package 12 contains the ambient atmosphere. The ambient air facilitates an isothermal environment for the fiber and the package. If desired, the atmosphere in the passage 26 is withdrawn and replaced by another gas.

The fiber is fixed in the package by inserting the fiber 14 in the package 12 and positioning the fiber 14 so that the grating 18 is within the confines of the package 12. Epoxy 22 is introduced into one end 24 of the package 12 such that the epoxy 22 contacts both the fiber 14 and the package 12. A second application of epoxy 22 is then introduced into the opposite end 24 of the package 12.

A vent hole 28, if provided, provides certain advantages in the package 12. The vent hole 28 permits trapped air to flow from the package 12. By providing an escape route for trapped air, the venthole 28 permits the second application of the epoxy 22 to be more easily inserted into the end 24 of the passage 26. Otherwise trapped air would provide resistance to placing the epoxy 22 into the second end 24.

In an alternate embodiment, only one grating 18 is written on the optical liar 14. In this embodiment, the grating 18 is located on the length of optical tier that is somewhere between the two points where the epoxy 22 is applied. Also, certain applications require more than two gratings to be written in the fiber. In this embodiment, the gratings are again written in that portion of the fiber interposed between the two points where the epoxy 22 is applied.

In yet another alternate embodiment, the optical fiber is only fixed to the package at one point. It is advantageous if that point is near one end of the package. The fiber is not fixed to the package at the opposite end. If the fiber that projects from the end at which it is unfixed is subjected to controlled strain, the grating wavelength is, in turn changed in a controlled manner. The grating wavelength is changed by manipulating and controlling the strain to which the fiber is subjected.

Optionally, the openings 30 at either end 24 of the package 12 are somewhat larger than the diameter of the passage 26 through the package 12. In this embodiment, the package 12 is provided with a tapered portion 22 from the opening 30 to the passage 26. This permits the fiber 14 to be more easily inserted in the package 12.

Several features of the package 12 protect the fiber 14 and the gratings 18 written therein from strain. If the package 12 and the fiber 14 have coefficients of thermal expansion that am about the same, the package will protect the gratings from strain because the fiber 14 and the package 12 expand or contract to about the same degree when subjected to a change in temperature. This prevents a strain on the fiber from the fiber and the package expanding to different degrees in response to a temperature change. Of course, the grating wavelength is affected by the expansion or contraction of the fiber in which it is written and the package does not eliminate this effect. However, the effect of strains caused by the fiber and package expanding to different degrees in response to a change in temperature is eliminated by selecting the same material for the fiber and the package. Fused silica or fused quartz are examples or materials from which a suitable fiber and package are made. However, in certain applications it is contemplated that the fiber will be made of fused silica and the package will be made of a different glass that has a similar, but not identical, coefficient of thermal expansion. Examples of other package glasses include borosilicate glasses. Although the dimensions of the package and the fiber therein will vary depending on how the packaged fiber is used, a typical outer diameter of the package for the optical fiber is 5 min.

In fact, heating or cooling of the fiber and package are contemplated as a means for changing the wavelength of the grating. By selecting a material for the package that has a coefficient of thermal expansion that is different from the coefficient of thermal expansion of the fiber core material, an even greater change in the grating wavelength is caused by a change in temperature. The different degrees of expansion or contraction of the fiber and the package subjects the fiber to mechanical stress. In the absence of a package, a change in temperature changes the wavelength of the grating according to the formula:

$$\Delta\lambda/\lambda = (\alpha_{fiber} + \xi)\Delta T \qquad (1)$$

where $\alpha_{fiber}$ is the thermal expansion coefficient of the fiber cladding and $\xi$ is the effective thermo-optic coefficient of the fiber core.

When the fiber is in a package, the package also contributes to the change in wavelength of the grating when the package and the fiber are subjected to a change in temperature. This change in grating wavelength is described by the following formula:

$$\Delta\lambda/\lambda = (1-p_e)(\alpha_{package} - \alpha_{fiber})\Delta T \qquad (2)$$

where $p_e$ is $n^2/2(p_{12} - v(p_{12}+p_{11}))$ and n is the index of refraction of the core, v is Poisson's ratio, $p_{11}$ and $p_{12}$ are the strain-optic coefficients, and $\alpha_{package}$ refers to the thermal expansion coefficient of the package. These equations are based on an analysis described in Meltz, G., et al. "Bragg Grating Formation and Germanosilicate Fiber Photosensitivity" SHE, 1516, pp. 185-199 (May 1991). For fused silica fiber, the variables in equation (2) are $p_e = 0.22$; $\xi = 6.9 \times 10^{-6}/°$ C.; and $\alpha_{fiber} 0.55 \times 10^{-6}/°$ C.

If, for example, a package is made of aluminum, then $$\alpha_{package} = 2.3 \times 10^{-5}/°C., \text{ and } \frac{\Delta\lambda}{\lambda} = 2.5 \times 10^{-5}/°C.,$$

whereas if the package is silica, then $$\frac{\Delta\lambda}{\lambda} = 7.5 \times 10^{-6}/°C.$$

In the above equations, $\Delta T = 0$ at the temperatures at which the fiber is placed in the package.

The optical fiber 14 that is placed in the package 12 is any suitable optical fiber. The gratings written in the fiber are known to those skilled in the art, as are methods for writing such gratings in germania-doped in silica fiber. Typically, gratings are written in a fiber using interfering beams of high intensity UV light that form an interference pattern. Such a method for writing gratings in optical fiber is disclosed in U.S. Pat. No. 5,042,897 to Meltz et al., the teachings of which are incorporated by reference. However, it is contemplated that the gratings are written in the fiber using other methods known to those skilled in the art. An alternate method for writing a grating in the fiber is by providing localized thermal energy to write the grating. Such a method is described in Archambault, J. L., et al., "Hundred Percent Reflectivity Bragg Reflectors Produced in Optical Fibers by Single Excimer Laser Pulses", *Electronics Letters*, 29:453 (1993), the teachings of which are incorporated by reference.

Such gratings, when written in an optical fiber, act as wavelength selective Bragg reflectors, which, if properly designed, allow a certain wavelength of light to reflect from the grating while reflecting other wavelengths of light. One such grating written in a fiber acts as an optical filter as described in U.S. Pat. No. 5,007,705 to W. W. Morey, et al.

Pairs of such gratings are used in a laser device. In such devices, two gratings are written in, for example, erbium doped fiber. An example of an erbium doped fiber is a high index germanosilicate ;fiber that is described in U.S. Pat. No. 5,237,576 to DiGiovanni et al. However, there are many optical fibers which are contemplated as suitable for placement in the package of the present invention. The two gratings are placed some suitable distance apart in the doped optical fiber. Electromagnetic radiation is then introduced into the doped portion of the optical fiber from a pump laser or some other acceptable source. The electromagnetic radiation causes the ions in the doped fiber to exhibit stimulated emission which builds up at the grating wavelength.

Such lasers operate more efficiently if the gratings remain as they are written in the fiber. If the fiber is subjected to strains which distort the fiber in the vicinity of a grating, the laser will change wavelength, loose power, or stop lasing altogether.

The fiber is further protected from external vibrations, and the strains caused by these vibrations, by placing the package on a material that absorbs vibration. Such materials are commonly known and include synthetic materials, paper materials, and other materials which are known to absorb vibrational energy.

The configuration of the package itself is a matter of design choice. The package has an internal passage which is adapted to receive the optical fiber. For example, a preformed capillary tube with an inner diameter that is sufficient for the fiber to be insulated and affixed therein is a suitable package. The material from which the package is made depends upon the desired application. Optical fibers are typically made of fused silica. If a change in temperature is not desired to cause a differential strain between the grating and the package, then the package is made of a fused silica (also known as fused quartz) material or, in certain applications, glasses with a coefficient of thermal expansion that is similar to that of fused silica. Suitable capillary tubes that am made from these materials are commercially obtained from the Wilmad Glass Co. located in Buena, N.J. One skilled in the art will appreciate that suitable capillary tubes are obtainable from a variety of sources, however. As discussed above, if a change in temperature is desired to bring about a greater change in wavelength, the package is made of a material, e.g. a metal such as aluminum, with a coefficient of thermal expansion that is substantially different the coefficient of thermal expansion of the fiber.

The fiber and the package are aligned in such a manner that the gratings and that portion of the fiber from which the coating has been removed are placed within the confines of the package. Epoxy is then introduced into one end of the package to fix the fiber to the package. Although epoxy is a preferred material, other materials suitable for fixing the fiber to the package, such as solder and the like materials, are also contemplated.

The epoxy is then cured by an acceptable means for curing the epoxy resin used. The epoxy is either radiation curable or heat curable. If the epoxy is heat curable, it is advantageous if it is cured at temperatures of 150° C. or less. Although there are many suitable means for heat curing the epoxy, one way is by placing the epoxied area of the package on a hot plate for a sufficient amount of time to cure the epoxy. The epoxy is then introduced into the opposite end of the package where it is cured as previously described. An epoxy resin that is cured by exposing the resin to ultraviolet light is also contemplated.

The fiber is placed in the package in a manner such that the wavelength of the grating or gratings written in the fiber, if changed at all, is not changed to an extent that the grating is no longer suitable for its intended use. In some applications, a grating wavelength change of one percent is acceptable. In other applications, a grating wavelength change of only 0.01 percent or less is permissible. It is contemplated that wavelength changes of essentially zero are obtainable using this method for placing a fiber in a package which makes the method suitable for all applications. For example, a fiber with a grating wavelength of 1553.86 nm was placed in a package. After that fiber was placed in the package, the grating wavelength was 1553.82 nm. A difference in the grating wavelength of about 0.0026 percent was therefore observed after the fiber was placed in the package.

We claim:

1. A package for an optical fiber comprising:
   an optical fiber with at least one grating therein, the optical fiber being made of a material with a particular coefficient of thermal expansion;
   a sleeve having an interior passage that is adapted to receive a portion of the optical fiber, the sleeve having a proximate end and a distal end, the sleeve being made of a material with a coefficient of thermal expansion that is about the same as the fiber material; and
   an adhesive means that affixes the optical fiber to the sleeve, wherein the optical fiber is positioned within the interior passage of the sleeve such that the grating written in the fiber is positioned between the proximate end and the distal end of the sleeve and wherein the optical fiber is affixed to the interior passage of the sleeve by the adhesive means at least at one point between the proximate end and the distal end of the sleeve.

2. The package of claim 1 wherein the adhesive means is an epoxy resin.

3. The package of claim 2 wherein the epoxy resin is interposed between the optical fiber and the sleeve at two points, one point near the proximate end of the sleeve and one point near the distal end of the sleeve.

4. The package of claim 1 further comprising a vent in the sleeve, the vent being located between the proximate and distal ends of the sleeve.

5. The package of claim 3 wherein the grating has a particular wavelength or wavelength band, and the wavelength or wavelength band of the grating does not shift more than 0.01 percent when the fiber is subjected to tensile forces of about 0 pounds per square inch to about 200,000 pounds per square inch.

6. The package of claim 1 wherein the optical fiber and the sleeve are comprised of fused silica.

7. A method for making a package for an optical fiber comprising:

introducing an optical fiber with at least one grating that reflects a particular wavelength or band of wavelength of light written therein into a sleeve having a proximate end and a distal end, wherein the sleeve has an internal passage from the proximate end to the distal end; and fixing the optical fiber to the internal passage of the sleeve at least at one point which is between the proximate end of the sleeve and the distal end of the sleeve such that the grating wavelength before the fiber is fixed in the sleeve is no more than one percent different than the grating wavelength after the fiber is fixed in the sleeve.

8. The method of claim 7 wherein the optical fiber is fixed to the internal passage of the sleeve at two points, one point which is near the proximate end of the sleeve and one point which is near the distal end of the sleeve.

9. The method of claim 7 wherein the optical fiber comprises a core and a coating and further comprising removing the coating from the portion of the optical fiber that is to be fixed to the internal passage of the sleeve prior to introducing the optical fiber into the sleeve.

10. The method of claim 8 wherein the optical fiber is fixed to the internal passage of the sleeve by introducing and curing an epoxy resin at one point at either the proximate or distal end of the sleeve and then by introducing and curing an epoxy resin at a second point near the other end of the sleeve.

11. A method for shifting the wavelength of a grating in an optical fiber comprising:

selecting a sleeve with a proximate end and a distal end wherein the sleeve has an interior passage therethrough;

inserting an optical fiber with at least one grating with a particular wavelength or wavelength band written therein into the sleeve, wherein a portion of the fiber protrudes from both the proximate end and the distal end of the sleeve;

fixing the fiber to the interior passage near at least one of the proximate or distal ends of the sleeve; and changing the tension on the optical fiber to effect a shift in the grating wavelength.

12. The method of claim 11 wherein the grating wavelength is shifted by fixing the fiber at one of either the proximate or distal ends of the sleeve and subjecting the optical fiber protruding from the end of the sleeve at which the fiber is unfixed to tension sufficient to change the grating wavelength to the desired degree.

13. The method of claim 11 wherein the wavelength of the grating is shifted by fixing the optical fiber with the grating therein to the sleeve at both the proximate and distal ends of the sleeve and subjecting the sleeve with the fiber therein to a change in temperature sufficient to achieve the desired change in the grating wavelength.

14. The method of claim 13 wherein the sleeve and the fiber have the same coefficient of thermal expansion.

15. The method of claim 13 wherein the sleeve and the fiber have different coefficients of thermal expansion.

* * * * *